United States Patent
Champ

[15] 3,669,919
[45] June 13, 1972

[54] POLYACRYLONITRILE PROCESS
[72] Inventor: Antony E. Champ, Charlotte, N.C.
[73] Assignee: Celanese Corporation, New York, N.Y.
[22] Filed: June 16, 1969
[21] Appl. No.: 833,540

[52] U.S. Cl............260/29.6 AN, 260/29.6 TA, 264/176 F
[51] Int. Cl. .........................................................C08f 45/24
[58] Field of Search ...........260/29.6 AN, 29.6 AO, 29.6 E, 260/29.6 MN, 29.6 T

[56] References Cited

UNITED STATES PATENTS

| | | | |
|---|---|---|---|
| 2,496,267 | 2/1950 | Chaney.................................. | 260/29.6 |
| 2,525,521 | 10/1950 | Caldwell............................... | 260/29.6 |
| 2,879,242 | 3/1959 | Weinstock............................ | 260/29.6 |
| 3,075,934 | 1/1963 | Grandine et al. .................... | 260/29.6 |
| 3,078,243 | 2/1963 | Bibolet et al......................... | 260/29.6 |
| 3,194,862 | 7/1965 | Coover et al. ....................... | 260/29.6 |

*Primary Examiner*—Harold D. Anderson
*Attorney*—Thomas J. Morgan, Stephen D. Murphy and Herbert M. Adrian, Jr.

[57] ABSTRACT

An improved method of producing a polyacrylonitrile extrusion solution particularly suited for the production of shaped articles, especially fibers, which eliminates several process steps previously associated with the polymerization of the acrylic polymer and the subsequent formation of the extrusion solution. The method is particularly applicable to high acrylic polymers such as those containing more than about 85 percent acrylonitrile wherein the polymers are formed by aqueous suspension polymerization methods. The wet acrylic polymer produced is directly used in an extrusion process by solvating the polymer with a lower alkyl nitrile, such as acetonitrile, to form the extrusion solution. The solvation is accomplished by adjusting the polymer water content to about 1 to 40 percent by weight of the polymer, adding sufficient acetonitrile to provide a polymer-solvent mixture of 20 to 70 percent of polymer solids by weight and subsequently heating the mixture under at least autogeneous pressure to above the atmospheric boiling point of the solvent to form a homogeneous polymer solution.

6 Claims, 1 Drawing Figure

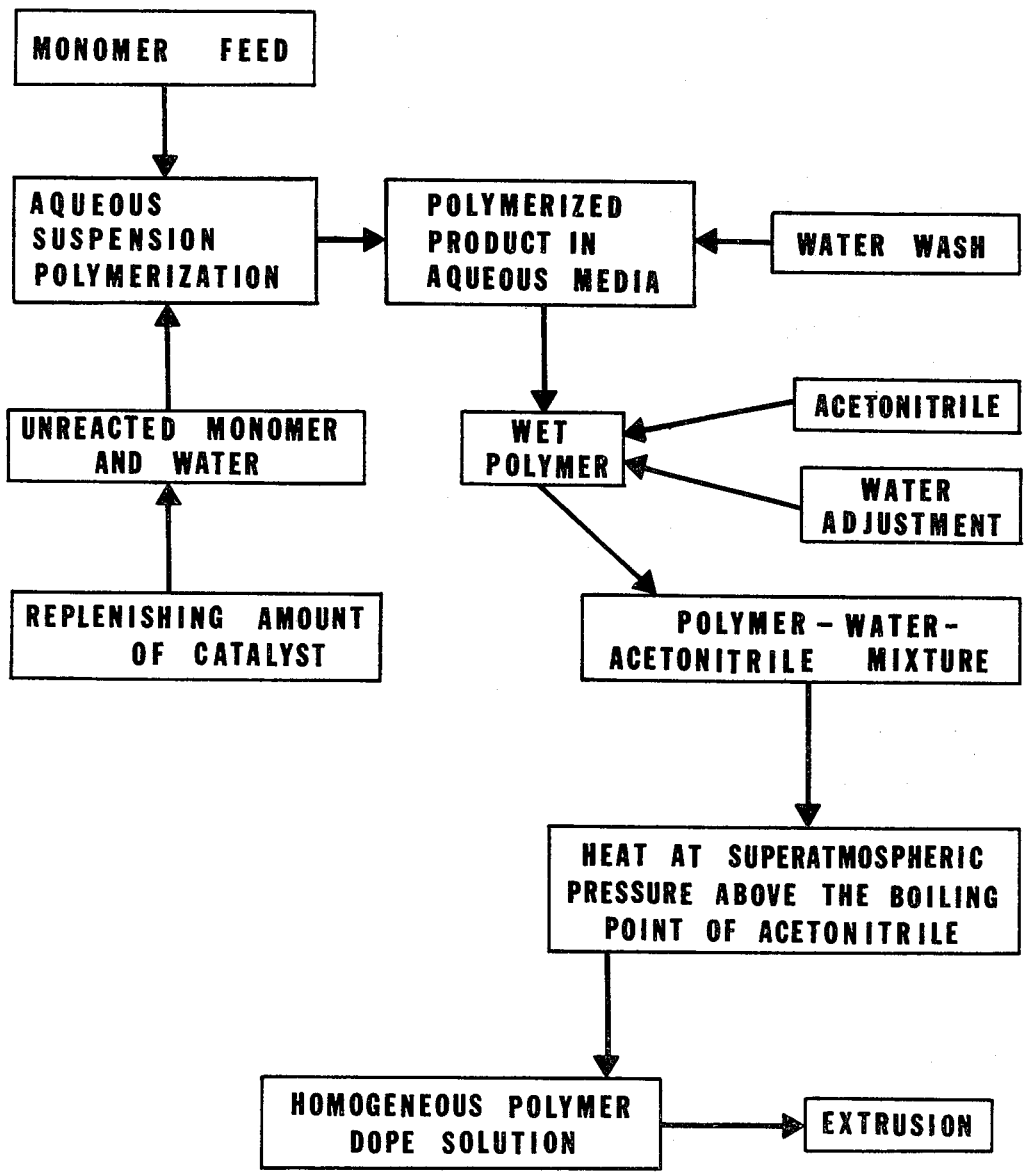
INVENTOR
ANTONY E. CHAMP
BY *Herbert M Adrian Jr*
ATTORNEY

POLYACRYLONITRILE PROCESS

BACKGROUND OF THE INVENTION

This invention relates to the preparation of extrusion solutions for polyacrylonitrile compositions, especially compositions used in the spinning of acrylic fibers. More particularly, the invention relates to the aqueous suspension polymerization of high polyacrylonitrile polymers and the direct utilization of such polymers in the preparation of extrusion solutions utilizing a novel solvent system.

The preparation of polyacrylonitrile compositions is well known in the art. Numerous methods of preparing such polymers have been disclosed heretofor. One particularly suitable method is the suspension polymerization of polyacrylonitrile utilizing water as the suspending agent. This method is particularly suitable for continuous production because the monomers utilized are soluble in the aqueous media, while the resulting polymer is substantially insoluble therein. Thus, as the polymer polymerizes, it separates as a solid phase from the reaction media and can thereby be readily removed without terminating the reaction. The resulting polymer, however, has substantial quantities of water therein and may contain catalysts which are often desirably removed. Thus, the resulting polymer is conventionally washed with water to remove unreacted monomer and catalysts which may adhere to the polymer, and subsequently dried to produce a polymer which is used to form extrusion solutions.

Previously known solvents for acrylonitrile polymers, particularly high acrylonitrile polymers containing more than about 85% acrylonitrile have been relatively limited. Conventionally, such solvents as dimethylformamide, dimethylsulfoxide and the like strong solvents have been used because of the limited solubility of high acrylic polymers in conventional solvents.

Applicant has recently discovered that under certain conditions, lower alkylnitriles of two to four carbon atoms, particularly acetonitrile, which is well known in the art to be a nonsolvent for such high acrylics, can under certain conditions, solubilize high polyacrylonitrile composition to produce a highly desirable extrusion composition. The method of solubilizing such polymers with acetonitrile is the subject matter of a separately filed United States Patent application, commonly assigned by the same inventor hereof and commonly assigned to the same assignee of the present invention. In such method, it was discovered that the presence of water in a certain amount was particularly desirable to attain certain solubility characteristics in the resulting solution such as viscosities, solutioning temperatures, solidification temperatures and the like polymer solution characteristics. Thus, contrary to previous solvent systems for polyacrylonitrile, it has been discovered that certain disadvantages of previous polymerization methods can be used to advantage in the method which is set forth hereinafter.

THE INVENTION

In accordance with the invention, a method is provided for producing an acrylonitrile dope extrusion solution comprising polymerizing a major proportion of acrylonitrile under aqueous suspension polymerization conditions to produce a wet polymer having an inherent viscosity of at least 0.5, adjusting the water content of the polymer to within the range of 1 to 40 percent by weight of the polymer, adding a lower alkyl nitrile of two to four carbon atoms in an amount to form a mixture of about 20 to 70 percent by weight of polymer solids and heating said mixture under at least autogeneous pressure to above the boiling point of the alkyl nitrile-water solvent to form a homogeneous solution of said polymer mixture.

The present method is particularly applicable to high acrylonitrile polymers containing more than about 85 percent acrylonitrile. A particular advantage of the present method is the capability of utilizing a completely integrated polymerization and dope preparation system which eliminates previous requirements of drying the polymer. A further distinct advantage resides in the utilization of a low-boiling, previously considered nonsolvent, to solubilize the polymer, which low-boiling solvent is rapidly removed during extrusion conditions, such as in dry spinning fibers or extruding moldings, tubing and the like shaped articles, thereby further overcoming previous difficulties with conventional high-boiling solvents which are not readily removed in dry spinning operations.

DETAILS OF THE INVENTION

The invention is more clearly described by reference to the drawing which is a flow sheet describing a preferred method of integrating the present process into a continuous polymerization and dope preparation system. As such, the process will be described more particularly with respect to the most preferred alkyl nitrile, e.g., acetonitrile. Accordingly, acrylonitrile monomer is continuously fed to an aqueous suspension polymerization reactor along with water, catalysts, initiators and the like feed materials. Polymerization is promoted by the catalyst system, acidic pH conditions and the temperature of the reactants. As is normal for such reactions, the reaction rate is largely temperature dependent. Higher temperatures result in faster reaction rates.

The monomers used are soluble in the aqueous medium at the concentrations normally used and the temperatures employed. As polymer is polymerized, it precipitates as a solid which is readily removed continuously or periodically from the reaction media. This is normally accomplished by decanting or filtering the solids off along with a certain amount of the aqueous medium. The polymerized product can be water-washed, as is normally desired, to remove unreacted monomer and catalysts which adhere to the polymer. The monomer containing effluent is preferably returned to the reactor for further reaction along with replenishing amounts of reactants.

The wet polymer is then adjusted in water content to that desired in the extrusion or dope solution to a water content of about 1 to 40 percent by weight of the polymer. Acetonitrile is also added to complete the solvent system. The addition is in an amount which provides the desired polymer solids level in the dope solution. Normally, this is in the range of 20 to 70 percent polymer solids by weight. The particular amount used is dependent upon the end use of the dope solution, the inherent viscosity of the polymer, the polymer composition and the like consideration.

The resulting polymer/acetonitrile/water mixture is a true mixture because the high acrylonitrile polymers are not soluble in this mixture under normal pressure and temperature conditions, e.g., below the boiling point of acetonitrile. Therefore, the mixture is heated, under superatmospheric pressure equal to at least the autogeneous pressure developed by the solvent, to above the atmospheric boiling point of the acetonitrile, and more specifically above the azeotropic boiling point of the acetonitrile/water mixture, until the polymer passes through a gelled phase into a true homogeneous solution. This is normally in the temperature range of 100° to 150° C. Higher temperature can be used, but are generally not needed. The polymer is then ready for extrusion in the desired manner.

Referring more specifically to the details of the present invention, the present invention can be utilized with high acrylonitrile polymers containing at least about 85 percent or more acrylonitrile, including homopolymers. Such polymers are well known in the art an normally are used in fiber production as copolymers, terpolymers and higher copolymerized products. Typically, varying amounts of other copolymerizable monomers are added to produce the co- and ter- polymers. Typically, ethylenically unsaturated monomers, such as methylacrylate, methyl methacrylate, vinyl acetate, vinylidene chloride, methylallyl alcohol, vinylidene cyanide, styrene sulfonic acid materials, such as sodium methylallyl sulfonate disodium allyl phosphate and the like can be used. With high acrylics, the amount of copolymerized monomer is up to about 15 percent, but more generally in the range of about 1 to 10 percent by weight. While sulfur containing monomers, particularly sulfates, are preferred to enhance the dyeability of the end polymer, other dye-enhancing compounds can be used such as those containing a phosphorous group or other dye-enhancing group, as are well known in the art.

The monomer concentration is maintained in the reaction at a level sufficient to promote a rapid and continuous polymerization thereof and in an amount which retains the monomer substantially in solution at the reaction temperature. Thus, the monomer concentration can vary from about 1 to 40 percent or more, but is generally in the range of about 2 to 25 percent by weight of the reaction media.

The reaction media is preferably acidified to promote the reaction by the addition of acidic compounds, particularly acids such as $H_2SO_4$. A pH range of about 2 to 5, and more preferably 3 to 4, has been found to be most desirable.

The catalysts preferably used in the present invention are free radical generating catalysts. Actinic radiation can also be used to promote the polymerization if desired. However, conventional free radical generating catalysts such as organic and inorganic peroxides are particularly useful. In general, any suitable acrylic catalyst polymerization system can be used, particularly those soluble in the reaction mixture. The particular catalyst selected should preferably be sufficiently active at the polymerization temperatures, e.g., below the boiling point of water and more preferably in the range of 25° to 80° C, in order to obtain a high productivity, a satisfactory molecular weight, a desirable slurry consistency, that is less than about 50 stokes, a desired molecular weight distribution and polymers of good color.

The polymerization catalyst may be of any suitable type including, for example, free radical-yielding catalysts, such as organic peroxides, represented by, for example, benzoyl peroxide, acetyl peroxide, lauroyl peroxide, succinyl peroxide, acetyl benzyl peroxide, oleayl peroxide, urea peroxide, di-t-butyl peroxide, dichlorobenzoyl peroxide, α-dicumyl peroxide; organic hydroperoxides, such as t-butyl hydroperoxide, cumene hydroperoxide, α-α-dimethylbenzyl hydroperoxide, and t-isopropyl benzene hydroperoxide; azo compounds, such as dimethyl α-α-azodiisobutyrate, α-α-azo-diisobutyronitrile, and azodicyclohexyl carbonitrile; inorganic oxidizing agents, such as hydrogen peroxide, alkali metal and ammonium persulfates, percarbonates, perborates, nitrates, chlorates, perchlorates, etc. (especially sodium, lithium and potassium derivatives), and further including the corresponding alkyl salts; ionic free radical catalysts, such as ferrous ion and hydrogen peroxide, ferrous ion and cumene hydroperoxide, peroxydisulfate and thiosulfate ion, hydrogen peroxide and zinc formaldehyde sulfoxylate, hydrogen peroxide and a trivalent titanium salt, potassium persulfate and sodium bisulfite, trivalent titanium and hydroxylamine in acid solution, ammonium persulfate and sodium metabisulfate, a bromate mixed with a bisulfite, etc.

The per compounds are used in quantities from about 0.1 to 3 percent by weight, based on the polymerizable monomers, and the reducing agents in quantities from 0.3 to 6 percent by weight. In many instances, heavy metal compounds, e.g. $Fe^{++}$, used in small quantities, have proved to be effective accelerators.

In addition to the salts used as Redox catalysts, suitable neutral salts, such as alkali metal sulphates an phosphates, may be present in the polymerization mixture as polymerization regulators. If desired, polymerization regulators including chain transfer agents and terminators such as aliphatic mercaptans, optionally those containing a hydroxyl group near the sulphydryl group, for example thioglycol, may also be used in the process according to the invention.

In general, the polymerization is conducted under an atmosphere of inert gas, such as nitrogen or $CO_2$. Also, if desired, the reaction may be effected under super or subatmospheric pressures, although atmospheric pressure is normally preferred.

For fiber end uses of the polymer, which is most often preferred, the polymerization is effected to obtain an inherent viscosity (I.V.) of about 0.5 to 2.5 and more preferably to about 1.2 to 1.8 as measured in a 0.1 percent solution of polymer in N,N'dimethylformamide. Of course, higher I.V.'s can be used, but normally they result in excessive viscosities and no particular improvement in fiber properties. For other uses such as coatings, the lower I.V.'s are often preferred.

The polymerized wet polymer is adjusted in water content to provide the desired water content in the dope solution. In the system described herein, water apparently acts with the acetonitrile to lower the solubility temperature and also effects the viscosity of the resulting solution. Therefore, it is desirable that a certain portion of the solvent system be water. Depending upon the particular polymer used, the proportion of water in the acetonitrile/water solvent system is about 2 to 40 percent water, more preferably, about 18 to 27 percent water with the remaining amount being acetonitrile. If desired, small additions of other solvents can also be used, but normally they are not needed or desired.

The polymer solid content can range from about 20 percent up to about 70 percent or more depending again upon the particular acrylic polymer composition, the comonomer, if any, used, the inherent viscosity thereof and the like factors. With high acrylics, and because of the uniqueness of the present solvent system, e.g., the solvent under the stated conditions is apparently soluble in the polymer rather than the polymer being soluble in the solvent, higher concentrations of solids are best used to achieve a completely homogeneous system. Thus, for high acrylics, solid contents above about 30 percent up to about 70 percent are the preferred, with 35 to 45 percent being the most preferred range. For a typical fiber spinning operation, a polymer solids content of about 40 percent has been found to be particularly desirable. Thus, the wet polymer is adjusted in water content to meet the end specification, which normally results in the adjustment of the water content to the range of about 1 to 40 percent by weight of said polymer.

Because the lower alkyl nitrile/water system is not a solvent for high acrylics under conventional temperature pressures, a homogeneous dope solution is prepared by heating the mixture under superatmospheric pressure to above the boiling point of the alkyl nitrile, such as acetonitrile and more preferably, above the azeotropic boiling point of acetonitrile and water. Typically, the pressure required is at least the autogeneous pressure developed by the solvent system, thereby maintaining the solvent system in the liquid phase. While the autogeneous pressure is sufficient, it is often convenient to increase the pressure up to about 100 pounds per square inch gauge or more above the autogeneous pressure as may be particularly desired in the particular solvating and extrusion system utilized. In the same manner, the heat utilized is normally dependent upon a particular polymer and the ease of solubility thereof, the proportions of water and acetonitrile which tend to dictate the solubilizing temperature and the like considerations.

Thus, the polymer is best heated to a temperature in the range of about 100° to 150° C and more preferably, in the range of about 110° to 130° C to effect the homogeneous solutioning thereof.

Having formed the homogeneous polymer solution, the temperature and pressure is maintained thereon to retain the solution in a liquid state. The release of pressure results in the rapid evaporation of the solvent and the consequent rapid solidification of the polymer. In the same manner, the lowering of the temperature drops the polymer below its solubility temperature, thereby also solidifying the polymer. Therefore, it is most convenient to pass the homogeneous dope solution directly to an extrusion process wherein shaped articles are made of the acrylic polymer. If desired, the prepared solution can be cooled and solidified and subsequently reheated under pressure to again liquify the dope.

The invention will be more fully described by reference to the following example, which illustrates certain embodiments of the present invention. Unless otherwise indicated, all temperatures are in degrees centigrade and all parts are by weight in the example and the appended claims.

EXAMPLE

The process of the present invention was operated in accordance with the drawing to produce a fiber-forming high acrylic comprised of about 94 percent acrylonitrile, 5.5 percent methylacrylate, and 0.5 percent sodium methallyl sulfonate. The reaction was run continuously after initially establishing equilibrium conditions within the reactor. Start-up was achieved by charging a reactor having agitation means therein with approximately 800 parts of previously prepared polymer, 200 parts of monomer mixture and 3800 parts of water. The reaction temperature was brought to 45° to 50°C. Monomer and catalysts feeds were initiated and the reaction maintained within the noted temperature range by thermostatic control. Polymer containing aqueous effluent was continuously drawn from the reactor to maintain a relatively constant fluid level in the reactor. A reaction residence time of approximately 4.5 hours resulted in the establishment of equilibrium conditions for continuous steady-state production. At steady-state conditions, the reaction media contained a catalyst-initiator concentration of approximately 0.5 percent potassium persulfate, 1.58 percent sodium metabisulfite, 0.65 percent sodium acetate and a trace of ferrous sulfate. Sufficient sulfuric acid was added to maintain a pH of about 3 to 4 in the reaction media. At steady-state conditions, the reaction media comprised approximately 24 percent monomer-polymer and 76 percent water. Dilute water solutions of catalysts and initiator were fed into the reactor at the rate of 1,862 parts per hour, while solutions of monomer to provide the desired weight ratio in the produced polymer were fed to the reactor at a rate of 1,138 parts per hour. Polymer containing effluent was removed from the reactor at a rate of 3,000 parts per hour, which provided an average residence time of 90 minutes in the reactor.

The reactor effluent was cooled to approximately 20° to 25° C. The polymer was filtered and the aqueous effluent returned to the reactor along with replenishing amounts of reactants.

The filter cake was washed with water and subsequently passed in wet form to a pressure vessel for solvation with acetonitrile. Analysis of the polymer indicated that it was comprised of approximately 94 percent acrylonitrile, 5.5 percent methyl acrylate and 0.5 percent sodium methallyl sulfonate, and had an inherent viscosity of 1.4 as measured in a 0.1 percent solution of dimethyl formamide at 25° C.

In the pressure vessel, acetonitrile and additional amounts of water were added to the polymer to provide a 40 percent solids portion of acrylonitrile polymer with the acetonitrile and water being in the proportions of 78 percent acetonitrile and 22 percent water. The pressure vessel was sealed and subsequently heated with mixing to about 100° C, at which point the material changed from a liquid-solid phase into a gel. Continued heating to above 105° C produced a homogeneous fluid solution. The resulting fluid solution could be cooled to as low as about 80° C without solidifying the solution. However, it was preferred to maintain a temperature of about 100° to 130° C and convey the homogeneous fluid solution directly to the extrusion process.

In the extrusion process, the release of the superatmospheric pressure as the polymer solution was extruded resulted in the rapid evaporation of the solvent and the solidification of the polymer. In the same manner, the dropping of the temperature below the solubility point, e.g., below about 80° C, also results in the solidification of the polymer.

In the same manner, greater and lesser amounts of water as described herein are utilized in the solvent system to achieve correspondingly good results. Changes in the water concentration changes the initial solubility temperature and the subsequent solidification temperature of the polymer.

The invention has been described with particular reference to a preferred suspension polymerization process, however, it will be recognized that various modifications in the catalysts used, the initiator system used, the monomer proportions and the like can be varied as is well known and within the skill of those knowledgeable in the art. The particular proportion of solids to acetonitrile/water solvent can be varied depending on the particular polymer used, desired viscosity of the resulting solution at the extrusion temperature and the particular inherent viscosity of such polymers.

While the invention has been described with reference to the preferred acetonitrile solvent because of its high volatility at comparatively low temperatures coupled with excellent solvating power for high acrylics under the conditions disclosed herein, other lower alkyl, particularly n-lower alkyl nitriles containing three to four carbon atoms, may be employed where desired. However, in such instance, higher temperatures and/or pressures are required for solvation and the advantage of high solvent volatility at dry spinning temperatures is somewhat lessened. Thus, in place of acetonitrile or in combination therewith, propionitrile, butyronitrile and isobutyronitrile, for example, and mixtures thereof can be used.

While there have been described various embodiments of the present invention, the methods described herein are not intended to be understood as limiting the scope of the invention as it is realized that changes therein are possible. It is intended to cover the invention broadly in whatever form its principles may be utilized being limited only by the appended claims.

What is claimed is:

1. A process for producing an acrylonitrile dope extrusion solution comprising polymerizing in a substantially inert atmosphere at least one ethylenically unsaturated monomer comprising at least a major proportion of acrylonitrile under aqueous suspension polymerization conditions to produce a wet polymer of at least 85 percent acrylonitrile and an inherent viscosity of at least 0.5 as measured in a 0.1 percent solution of polymer in N,N'-dimethylformamide, adjusting the water content of the polymer to within the range of 1 to 40 percent by weight of said polymer, adding a solvent consisting essentially of a lower alkyl nitrile of two to four carbon atoms in an amount to form a mixture of about 20 to 70 weight percent of polymer solids and heating said mixture to a temperature of from about 100° to 150° C under at least autogeneous pressure to above the atmospheric boiling point of the alkyl nitrile/water to form a homogeneous extrusion solution of said polymer mixture.

2. The process of claim 1 wherein the lower alkyl nitrile is acetonitrile.

3. The process of claim 2 wherein the acrylonitrile is copolymerized with at least one other copolymerizable monomer.

4. The process of claim 1 wherein the polymer comprises at least 85 percent acrylonitrile and two additional copolymerizable ethylenically unsaturated monomers, one of which is a sulfur-containing monomer, said polymer being admixed with acetonitrile and water in a proportion of about 35 to 70 percent polymer solids with the residual being acetonitrile and water in a weight ratio of 2 to 40 percent water and 60 to 98 percent acetonitrile, said mixture being heated to a temperature of 100° to 150° C under at least the autogeneous pressure with mixing to obtain a homogeneous solution thereof.

5. The process of claim 4 wherein the copolymerizable monomers are methylacrylate and sodium methallyl sulfonate.

6. The process of claim 4 further comprising directly feeding the homogeneous solution under elevated temperatures and superatmospheric pressure to a means for extruding said solution and extruding said solution.

* * * * *